INVENTOR:
Janos BIRI
BY Arthur O. Klein
his Attorney

Sept. 1, 1970 J. BIRI 3,526,785

SAMPLING AMPLIFIER HAVING FACILITIES FOR AMPLITUDE-TO-TIME CONVERSION

Filed March 24, 1966 4 Sheets-Sheet 2

INVENTOR:

Janos BIRI

BY Arthur O. Klein his Attorney

INVENTOR:
Janos BIRI
BY Arthur O. Klein
his Attorney

INVENTOR
Janos BIRI

BY Arthur O. Klein
ATTORNEY

United States Patent Office 3,526,785
Patented Sept. 1, 1970

3,526,785

SAMPLING AMPLIFIER HAVING FACILITIES FOR AMPLITUDE-TO-TIME CONVERSION

Janos Biri, Budapest, Hungary, assignor to Kozponti Fizikai Kutato Intezet, Budapest, Hungary Filed Mar. 24, 1966, Ser. No. 537,037
Int. Cl. H03k *5/20*
U.S. Cl. 307—235 3 Claims

ABSTRACT OF THE DISCLOSURE

A self-contained, negative feedback emitter-follower transistor amplifier is provided with facilities for (1) sampling a test voltage applied thereto; (2) storing the sample; and (3) converting the stored sample into a pulse whose duration is proportional to the difference between the sampled voltage and a lower reference voltage. The feedback path, which is normally adjusted to have unity gain, includes a normally open diode and the base-collector path of a second transistor. When sampling is desired, a diode gate is enabled to couple the test voltage to the amplifier input through the collector-emitter path of the second transistor. A capacitor coupled to the feedback diode stores the resulting amplifier output, which is a replica of the sampled voltage. Amplitude-to-time conversion of the sample is effected by disabling the feedback path and thereafter suitably discharging the capacitor so that its voltage decreases linearly from the stored sample value to the value of the reference voltage, at which time normal feedback is restored.

This invention relates to signal translation apparatus and, more particularly, to apparatus for translating an analog signal or one out of several analog signals selected by the translation apparatus into a form suitable for measurement by digital techniques. One object of the invention, therefore, is to provide new and improved apparatus of this character.

The variation of many physical quantities as a function of time or some other variable is frequently represented by a succession of voltage pulses or by the variation of the magnitude of a continuous DC voltage. A convenient way to measure such physical variations is to measure the peak amplitude of the continuous DC signal by amplitude-to-time conversion. In such cases, the successive pulses or discrete amplitude samples are applied to the input of an analog translation unit interposed between the source of such pulses or samples (hereinafter collectively called "pulses") and the digital measuring equipment to convert the input signal into proper form for such further digital processing. In typical analog translation units of this type, the pulses are gated with unmodified amplitude through a first unit (a linear gate) to a second unit (a temporary storage device). The resulting voltage stored on the second unit, in turn, is typically applied to a third unit (an amplitude-time converter) for converting the analog amplitude information on the temporary storage device to the equivalent analog time information ultimately needed for digital time measurement.

The overall inaccuracy of such prior art translation units is approximately the sum of the inaccuracies of the first, second and third tandem-connected units. Thus, for a given accuracy of the overall translation device, the separate units therein must be frequently overdesigned to assure that their individual accuracies are substantially greater than the overall accuracy of the translation unit. This, in turn, involves increased circuit complexity and/or cost. While techniques are known to combine the functions of temporary storage and amplitude-to-time conversion into one unit or for converting the voltage stored in the temporary storage device to a digital code without the use of amplitude-to-time conversion (e.g., by the use of current-voltage-weighting), the tandem-connected linear gate and temporary storage device are still required so that the same problem exists on a somewhat diminished scale.

Another object of the invention, therefore, is to decrease the complexity and/or cost of an analog translation unit of the above type without diminishing its overall accuracy.

A further object of the invention is to increase the overall accuracy of an analog translation unit of the above type by eliminating cumulative errors when converting the input pulses into a form suitable for digital measurement.

These objects are attained with an illustrative apparatus in accordance with the invention, in which a negative feedback amplifier arrangement is employed to sample and store a test voltage of given (e.g., positive) polarity during a first interval and to thereafter convert the stored sample into a pulse whose duration is proportional to the difference between the amplitude of the sample and a reference voltage. The test voltage to be sampled is applied to the base of a first transistor. A first normally disabled diode gate is operated over the first interval to sample the test voltage by coupling the collector-emitter path of the first transistor to the input of an emitter-follower amplifier through the collector-emitter path of a second transistor so that the output voltage of the amplifier is in phase with the test voltage. A feedback path is closed around the amplifier through a normally open diode and the base of the second transistor. The feedback path is adjusted to provide essentially unity gain between the base of the first transistor and the output of the amplifier.

With this arrangement, the signal appearing at the output of the amplifier during the first interval is a faithful replica, in amplitude and phase, of the input sample. In this respect, the arrangement performs the function of a linear gate.

The output of the amplifier is coupled to a capacitor disposed in the feedback path at the output of the diode. The stored level will be unaffected despite the fact that the negative-going step appearing at the amplifier input when the sample is removed at the end of the first interval is operative to close the diode and to disable the feedback path. Thus, the arrangement also performs the function of storing the sample.

To obtain amplitude-to-time conversion for the stored sample, a DC reference voltage applied to the base of a third transistor is coupled to the amplifier after the termination of the first interval. Such coupling is accomplished by operating a normally disabled second diode gate to connect the collector-emitter path of the third transistor to the amplifier input through the collector-emitter path of the second transistor. As before, the feedback path is adjusted to provide substantially unity gain between the base of the third transistor and the output of the amplifier. A normally disabled constant current discharge generator connected across the storage capacitor is switched on when the second diode gate is activated. The resulting linear decrease of the capacitor voltage from the sample value initially stored thereon at the time of disabling of the feedback path will continue until such voltage reaches the reference level at the base of the third transistor. At that time, the feedback diode is switched back to its conducting state to reactivate the feedback path. The length of time between the switching on of the discharge generator and the reopening of the feedback path is proportional to the difference between the amplitudes of the sample and reference voltages.

An additional advantage of this arrangement is that a plurality of test voltages may be sampled in succession by operating a plurality of associated diode gates in the manner indicated above. During the amplitude-to-time conversion step, each such sample may be compared to a common reference voltage, or alternatively, to separate reference voltages.

The nature of the invention will appear more fully from the following detailed description taken in connection with the appended drawing, in which.

Figure 1:
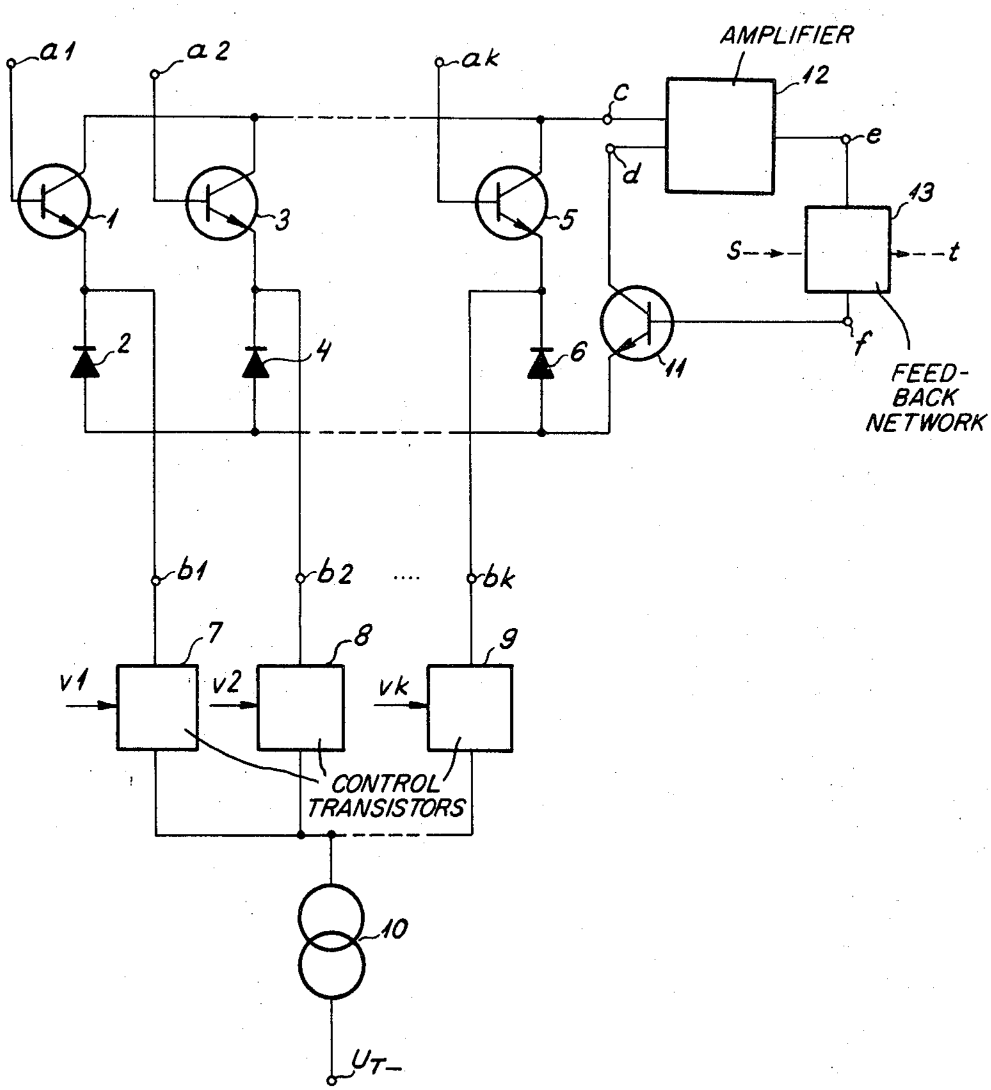
FIG. 1 is a combined block and schematic diagram of a generalized analog translation unit in accordance with the invention.

Referring in more detail to the drawing and more particularly to FIGS. 1, 3, 4 and 5, a first illustrative embodiment of an analog translation unit in accordance with the invention is depicted. It will be assumed for purposes of illustration that a test signal in the form of a voltage of positive polarity is to be sampled and subsequently converted to a form suitable to be evaluated by digital time measuring techniques. Three functions will be therefore required for translation: 1, linear gating; 2, temporary storage; and 3, height-to-time conversion.

As shown best in FIG. 1, a K-input analog translation unit is provided with a plurality of positive input signals *a*1, *a*2 . . . *ak*, a selectable one of which may be translated by the unit and made available at a predetermined one of output terminals, *e*, *f* and *t*, as described in more detail below. While the unit is shown as accommodating K different input signals, only two of them (i.e. *a*1 and *a*2) will be discussed in detail. It will be understood that other input signals (illustratively *ak*) may be handled in an identical manner.

The positive test voltage *a*1 to be processed by the analog translation unit of FIG. 1 is applied to the base electrode of a first NPN transistor 1. A reference voltage *a*2 of positive polarity, which is assumed to be invariant over the time required for digital measurement at the output of the translation unit, is applied to the base electrode of a second NPN transistor 3.

Figures 3, 5:
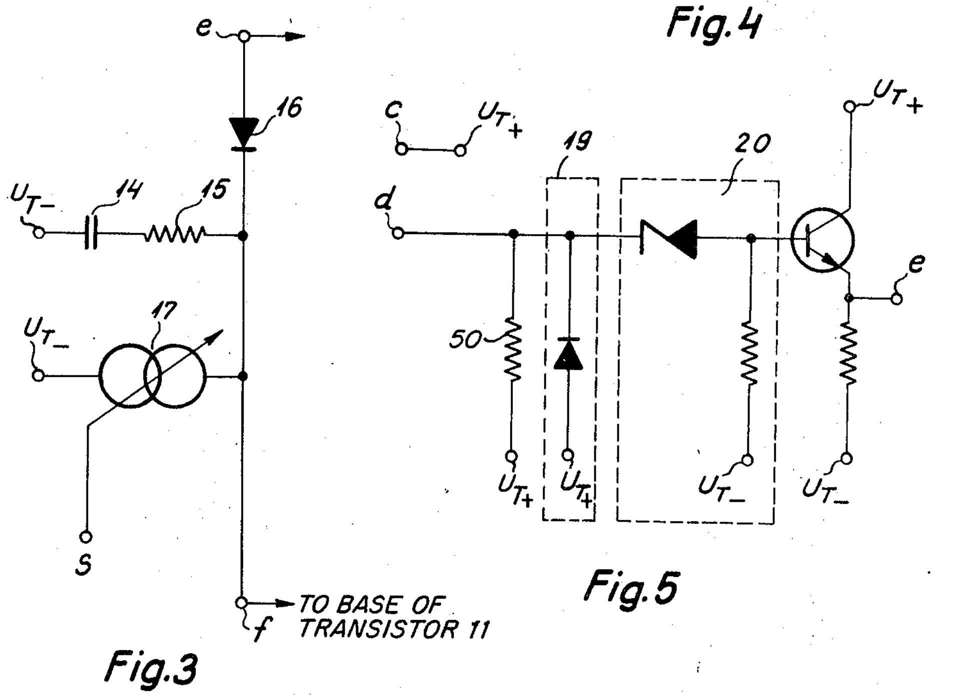
FIG. 3 is a schematic diagram of a modification of the feedback circuit of FIG. 2.
FIGS. 5, 6 and 7 are schematic diagrams of first, second and third embodiments respectively, of an amplifier suitable for use in the arrangement of FIG. 1.

The emitter electrodes of the transistors 1 and 3 are respectively connected to the cathodes of a pair of gating diodes 2 and 4, the anodes of which are coupled in common to the emitter electrode of a third NPN transistor 11. The collector electrode of the transistor 11 is connected to an input terminal *d* of an amplifier 12. As shown in FIG. 5, the input terminal *d* is coupled through a clamper 19 and a level adjustor 20 to the base of a fourth NPN transistor connected as an emitter follower. The output terminal of the analog translation unit is assumed to be taken at the output *e* of the amplifier 12 for reasons indicated below.

The collectors of the transistors 1 and 3 are supplied in parallel with operating bias voltage through a terminal *c*, which illustratively is connected to a suitable bias supply (designated $U_{T+}$ in FIG. 5) in the amplifier 12. For the sake of simplicity, the same symbol $U_T$, with appropriate sign, will be used to designate the different positive and negative supply voltage needed to set the operating points of the various circuits described herein, in a manner well known in the art.

A negative feedback loop is closed between the output *e* and the input *d* of the amplifier 12 through a network 13 and the base-collector path of the transistor 11. It is assumed that the feedback loop is adjusted in a manner well known in the art, so that the voltage gain between the base electrode of transistor 1 or 3 and the amplifier output *e* is essentially unity when the gating diode 2 or 4 is made conductive in the manner described below.

The circuit 13, shown in more detail in FIG. 3, includes a third diode 16 coupled between the output *e* of the amplifier 12 and the base of the transistor 11. The diode 16, which is polarized to conduct positive signals at the output of the amplifier 12, also couples such output signals to a capacitor 14 through a charging resistance 15. A normally disabled discharge current generator 17 which is provided with an enabling input S, is connected across the RC circuit 14, 15.

Figure 4:
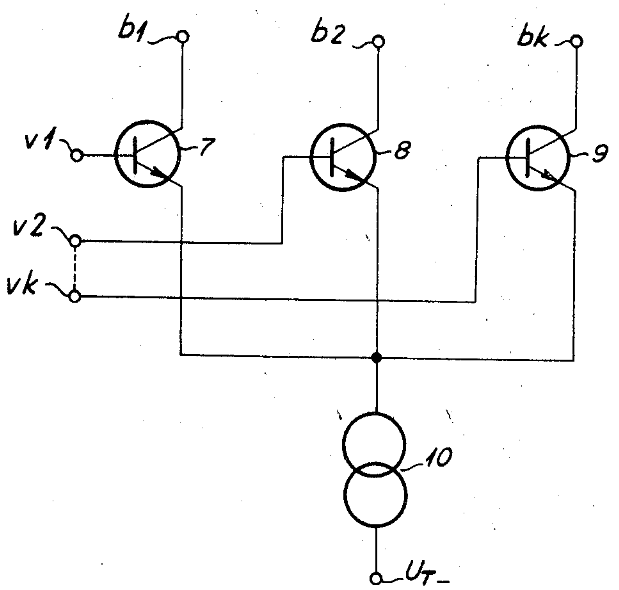
FIG. 4 is a schematic diagram of a gating control circuit suitable for use with the arrangement of FIG. 1.

A suitable current generator 10 (FIG. 1) is provided for supplying energizing current through a selected one of a pair of gating circuits 7 and 8 respectively to the junction of transistor 1 and gating diode 2 or to the junction of transistor 3 and diode 4. One embodiment of this arrangement is shown in FIG. 4, wherein the gating circuits 7 and 8 are illustratively in the form of NPN transistors. Control inputs *v*1 and *v*2 are respectively coupled to the base electrodes of the transistors 7 and 8. The output of the current generator 10 is applied in parallel to the emitters of the transistors 7 and 8. The collector electrodes of the last-mentioned transistors are coupled to the above-mentioned junctions between transistor 1 and diode 2 and between transistor 3 and diode 4 through a pair of output terminals *b*1 and *b*2, respectively.

Figures 9, 10:
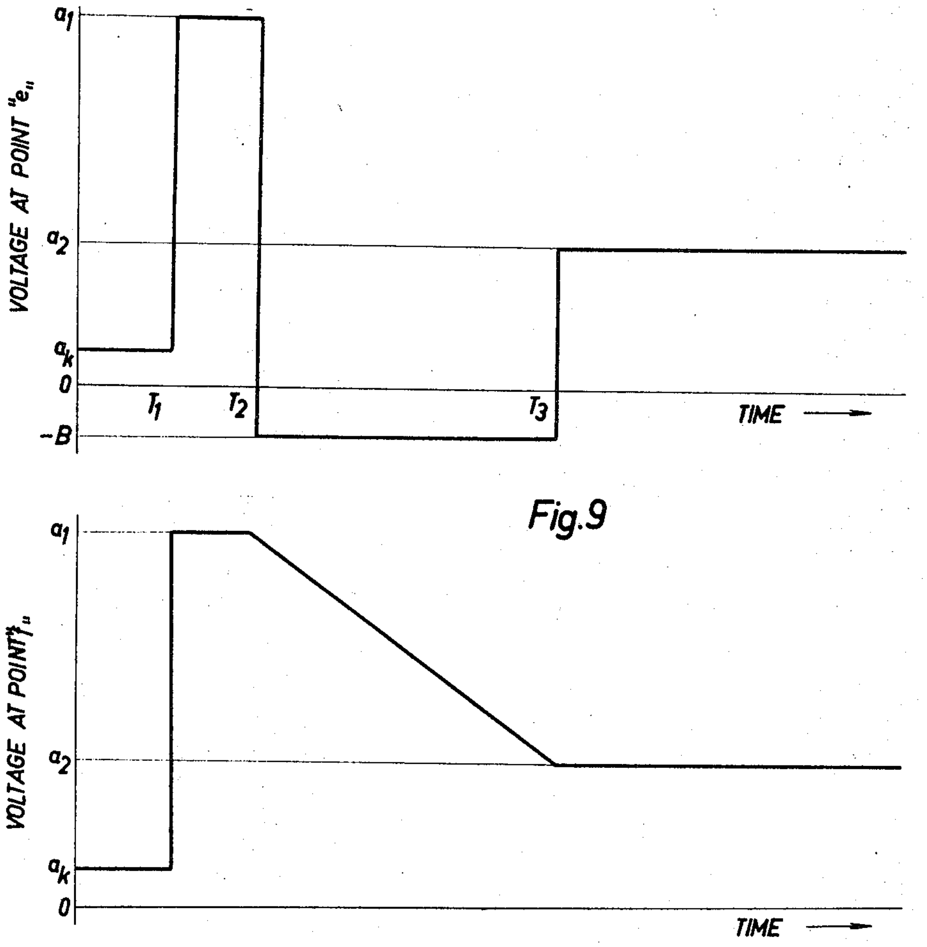
FIGS. 9–10 are waveform diagrams of the voltages at points *e* and *f*, respectively, of FIG. 1.
Figure 8:
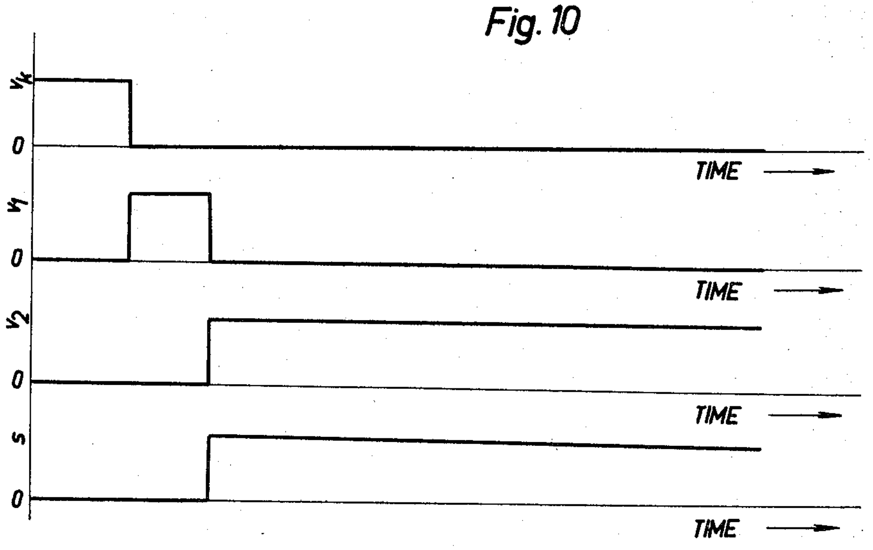
FIG. 8 is a timing diagram showing the sequence of triggering the storage and amplitude-to-time conversion functions of the invention.

A timing diagram to aid in the following brief summary of the operation of the sampling and amplitude-to-time conversion functions of the invention is shown in FIG. 8, while corresponding voltage-time graphs of the instantaneous voltages at points *e* and *f* of FIG. 1 are shown in FIGS. 9–10.

Prior to the sampling time $T_1$ shown in the timing diagram, it is assumed that steady state conditions are established in the manner described below in the circuit shown in FIG. 1 so that the voltage at points *e* and *f* (and thereby at the base of transistor 11) is at the level $a_k$ applied to the base of the transistor 5. It is further assumed that $a_k$ is less than the reference voltage $a_2$ applied to transistor 3, while $a_2$ in turn is less than the test voltage $a_1$ applied to transistor 1.

Illustratively, such steady state condition may be established by applying a control pulse $v_k$ to the control transistor 9 to open the latter and to thereby switch the diode 6 into its conducting state. Thus, emitter current from the transistor 5 is coupled to the input terminal *d* of the amplifier 12 (embodied as the emitter follower shown in FIG. 5) through the conducting diode 6 and the collector-emitter path of the transistor 11. Because of the emitter-follower configuration of the amplifier 12, its output voltage at point *e* will rapidly build up in phase with the voltage $a_k$ applied to the base of the transistor 5. The voltage at point *e* is coupled through the diode 16 (FIG. 3) of the network 13 and applied to the base (terminal *f*) of the transistor 11. When the voltage at such base reaches the value $a_k$, the system stabilizes since the feedback loop *e–d* is adjusted, as indicated in the specification, for unity gain between the base of each of the input transistor 1, 3, and 5 and the point *e*. The level $a_k$ at the point *e* is stored across the capacitor 14 (FIG. 3) in the network 13. (The timing diagram depicts the level $a_k$ at both points *e* and *f* under these steady-state conditions.)

At the start of the sampling interval at time $T_1$, the control voltage $v_k$ is switched off to close transistor 9 and the control voltage $v_1$ is switched on to open control transistor 7. The opening of the latter switches the diode 2 into its conducting state and couples emitter current from the transistor 1 to the amplifier input *d* via the collector-emitter path of the transistor 11. As a result, the voltage at the points *e* and *f* (and thus the voltage at the base of the transistor 11) rises rapidly from the stored value $a_k$. When such voltage reaches the value $a_1$, the system again is in equilibrium because of the unity gain of the feedback loop as indicated above. Thus, the test voltage amplitude sampled at time $T_1$ may be indefinitely stored across the capacitor 14.

At the time $T_2$, the sampling interval is terminated by decoupling the control voltage $v_1$ from the transistor 7. Simultaneously, the control voltage $v_2$ is applied to the control transistor 8 and the control voltage S (FIG. 3) is applied to the discharge current generator 17 in the network 13. The removal of the control voltage $v_1$ (FIG. 1) decouples the test voltage $a_1$ from the amplifier 12 so that a negative-going step appears at the input *d* of the amplifier 12. The resulting negative-going output pulse at point *e* cuts off the diode 16 (FIG. 3) since the voltage $v_1$ at point *f* cannot change instantaneously because of the capacitor 14. The resultant disabling of the network 13 opens the feedback loop.

While the feedback loop is thus disabled the transistor 3 remains closed despite the fact that the opening of transistor 8 switches on the diode 4. This is because of the fact that, notwithstanding the presence of the voltage $a_2$ at the base of the transistor 3, the higher potential $a_1$ on the base of the transistor 11 is coupled to and reverse-biases the emitter of the transistor 3 through the base-emitter path of the transistor 11 and the conductive diode 4. The only input to the terminal *d* of the amplifier 12 during this cut-off interval is the negative polarity current from the generator 10 applied through the path including control transistor 8, the diode 4, and transistor 11. The output level *e* of the amplifier 12 under these conditions is maintained at a corresponding negative level (designated —B) as set by the clamper 19 (FIG. 5) at the amplifier input *d*.

The switching on of the discharge current generator 17 (FIG. 3) by the voltage S at the time $T_2$ causes the capacitor voltage at point *f* (and thus the base voltage of the transistor 11) to decrease linearly from its initial level $a_1$. Such increment of voltage change is transmitted to the emitter of the cut-off transistor 3 through the diode 4 to reduce the reverse bias thereof. (It will be understood that because of the presence of the clamper 19, such linear decrease in voltage at point *f* will not change the output level —B at point *e*.)

At the instant $T_3$ that the voltage at the point *f* has reached the level $a_2$ on the base of the transistor 3, the latter is switched on and the emitter current thereof is applied to the input *d* of the amplifier 12 through the diode 4 and the transistor 11. The output voltage at point *e* thereupon builds up rapidly from the previously clamped level —B as a positive-going step; and when such build-up exceeds the level $a_2$ at point *f*, the diode 16 in the network 13 is switched back into its conducting state to re-establish the feedback path. Such action thereafter maintains the points *e* and *f* at the voltage $a_2$ on the base of the transistor 3.

It is seen, therefore, that the duration of the output pulse at point *e* between the negative-going step at time $T_2$ and the subsequent positive-going step at time $T_3$ is proportional to the voltage difference $(a_1-a_2)$. Thus the overall circuit of FIG. 1 acts as a sampling (i.e., gate and storage) element from time $T_1$ to time $T_2$ and as an amplitude-to-time converter for the sampled quantity between times $T_2$ and $T_3$.

Figure 6:
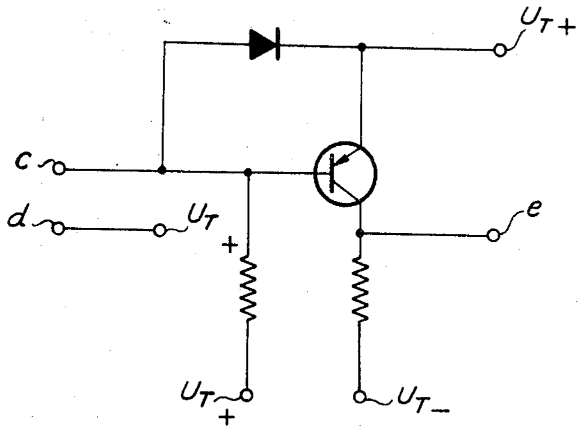

In order to obtain higher translation accuracy, the common emitter configuration shown in FIG. 6, may be substituted for the emitter follower of FIG. 5 as the amplifier 12. In such a case, operating bias is supplied to the emitter of the selected one of transistors 1 and 3 from the amplifier 12 through terminal *d* and the collector-emitter path of the transsistor 11. The collectors of the transistors 1 and 3 are coupled in parallel to terminal *c* which now forms the input terminal of the amplifier. Terminal *c* is connected to the base of a first PNP transistor forming the common-emitter stage. The feedback loop may now be closed from output *e* to input *c* through the diode 16 (FIG. 3), the base-emitter path of the transistor 11 (FIG. 1), and the collector-emitter path of the selected one of transistors 1 and 3. Because of the higher open-loop gain of the common-emitter stage of FIG. 6 when compared to the emitter-follower stage of FIG. 5, it may be necessary to adjust the feedback loop differently to obtain unity closed-loop voltage gain between the bases of the transistors 1 and 3 respectively and the output *e* of the amplifier 12. The operation of the analog translation unit of FIG. 1 when employing the common-emitter stage of FIG. 6 as the amplifier 12 is substantially the same as that described above in connection with the emitter-follower stage of FIG. 5.

Figure 7:
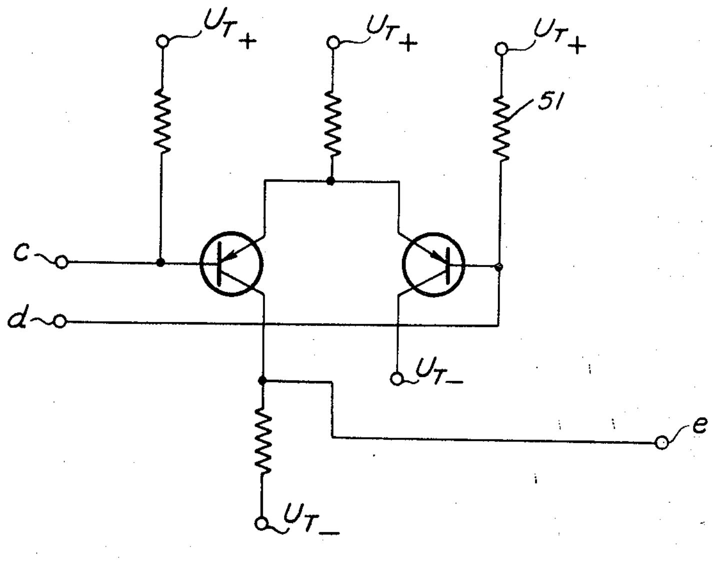

Further improvement in accuracy may be obtained if the amplifier 12 takes the form of the differential amplifying stage shown in FIG. 7. In this arrangement, the collector of the transistor 11 is coupled to the base electrode of a second PNP transistor through terminal *d*. The remainder of the circuitry external to the amplifier 12 itself is similar to that discribed in connection with FIG. 6. The output *e* of the amplifier 12 is connected to the collector electrode of the first PNP transistor. The feedback loop is adjusted to yield unity gain, as before. The operation of the analog translation unit when the differential arrangement of FIG. 7 is employed as the amplifier 12 is again the same as that described above in connection with FIGS. 1, 3, 4 and 5.

Figure 2:
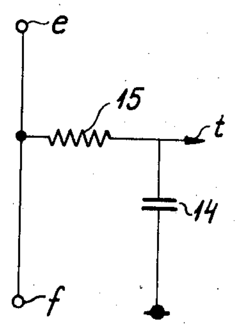
FIG. 2 is a schematic diagram of a portion of a feedback circuit suitable for use in the arrangement of FIG. 1.

If the diode 16 and the discharge current generator 17 are moved from the circuit of FIG. 3, the arrangement of FIG. 2 results. This latter scheme permits the output of amplifier 12 to follow any selected signal at the input of the unit, irrespective of polarity. In this configuration, therefore, the analog translation unit acts as a linear gate or, alternatively, as a common sampling unit for the signals $a_1$ and $a_2$ (FIG. 1).

When the configuration of FIG. 2 is employed and the measuring apparatus to be connected to the output of the unit has a high input capacitance, improved performance may be obtained by coupling the measuring apparatus to the terminal *t* (i.e., the junction of the resistor 15 and the capacitor 14) rather than to the amplifier terminal *e*.

While the above-described embodiments of the invention were assumed to have only two selectable inputs $a_1$ and $a_2$, it will be understood that any number of additional inputs may also be accommodated in the manner described. Where the amplitude-to-time conversion step is required, each signal input must be paired with a reference input; the same reference input may be used with all signal inputs, if desired. It is also necessary to remember that if a total of K inputs are provided in the translation unit of FIG. 1 $(K-1)$ units must be disabled at any one time.

It will be apparent that if negative-amplitude signals $a_1$, $a_2$–$a_k$ are to be accommodated in place of the positive-amplitude signals considered above, the operation of the translation unit will be identical if all the transistors considered in this description are replaced by transistor of opposite conductivity type and bias excitation, and if all dodes are replaced wth diodes of opposite polarity.

What is claimed is:

1. Apparatus for sampling a test voltage during a first interval and for thereafter converting the sampled voltage into a first pulse whose duration is proportional to the difference between the sampled voltage and a reference voltage, which comprises:

first, second, and third transistors each having a base electrode and a collector-emitter path;

means for indivdually coupling the test and reference voltages to the base electrodes of the first and second transistors;

an amplifier having an input, an output, and a first bias supply terminal;

a feedback path comprising, in combination, a normally open diode and the base-collector path of the third transistor interconnecting the output and the input of the amplifier, and a storage capacitor coupled between the output of the diode and the first bias supply terminal for normally storing the output of the amplifier;

means operative during the first interval for coupling the collector-emitter path of the first transistor to the input of the amplifier through the collector-emitter path of the third transistor so that the stored amplifier output is proportional to the test voltage during the first interval;

means operative at the conclusion of the first interval for closing the normally open diode to disable the feedback path;

means operative when the feedback path is disabled for discharging the capacitor to linearly decrease the voltage thereacross from the test voltage stored thereon at the conclusion of the first interval; and means for reopening the closed diode to reestablish the feedback path when the capacitor voltage has decreased to the level of the reference voltage, the last-mentioned means comprising means operative at the conclusion of the first interval for coupling the collector-emitter path of the second transistor to the input of the amplifier through the collector-emitter path of the third transistor, whereby the output of the amplifier exhibits the first pulse while the feedback path is disabled.

2. Apparatus as defined in claim 1, wherein the amplifier is an emitter-follower stage.

3. Apparatus as defined in claim 1, wherein the gain of the apparatus from the base of the first transistor to the output of the amplifier is substantially unity when the diode in the feedback path is open.

References Cited

UNITED STATES PATENTS

| | | | |
|---|---|---|---|
| 2,994,825 | 8/1961 | Anderson | 332—9 X |
| 3,053,996 | 9/1962 | Stefanov | 307—265 X |
| 3,390,354 | 6/1968 | Munch | 332—9 |

D. D. FORRER, Primary Examiner

STANLEY D. MILLER, Assistant Examiner

U.S. Cl. X.R.

307—243, 264, 265; 328—151